(12) United States Patent
Cole

(10) Patent No.: US 10,551,274 B2
(45) Date of Patent: Feb. 4, 2020

(54) METHODS AND APPARATUS TO DETECT LEAKS

(71) Applicant: Itron, Inc., Liberty Lake, WA (US)

(72) Inventor: Philip Alan Cole, Stow, MA (US)

(73) Assignee: ITRON, INC., Liberty Lake, WA (US)

( * ) Notice: Subject to any disclaimer, the term of this patent is extended or adjusted under 35 U.S.C. 154(b) by 138 days.

(21) Appl. No.: 15/808,539

(22) Filed: Nov. 9, 2017

(65) Prior Publication Data
US 2019/0137353 A1    May 9, 2019

(51) Int. Cl.
| | |
|---|---|
| G01M 3/24 | (2006.01) |
| H04B 17/23 | (2015.01) |
| H04B 17/26 | (2015.01) |
| H04B 17/21 | (2015.01) |
| E03B 7/00 | (2006.01) |

(52) U.S. Cl.
CPC ............ *G01M 3/243* (2013.01); *H04B 17/21* (2015.01); *H04B 17/23* (2015.01); *H04B 17/26* (2015.01); *E03B 7/003* (2013.01)

(58) Field of Classification Search
CPC ........ G01M 3/24; G01M 3/243; H04B 17/21; H04B 17/23; H04B 17/26; E03B 7/003
See application file for complete search history.

(56) References Cited

U.S. PATENT DOCUMENTS

| | | | |
|---|---|---|---|
| 5,038,614 A | 8/1991 | Bseisu et al. | |
| 5,974,862 A | 11/1999 | Lander et al. | |
| 6,453,247 B1 | 9/2002 | Hunaidi | |
| 6,567,006 B1 | 5/2003 | Lander et al. | |
| 6,957,157 B2 | 10/2005 | Lander | |
| 8,643,716 B1 | 2/2014 | Kalokitis et al. | |
| 2006/0036404 A1 | 2/2006 | Wiklund et al. | |
| 2010/0106434 A1 | 4/2010 | Killion et al. | |
| 2011/0301882 A1 | 12/2011 | Andersen | |
| 2013/0036796 A1 | 2/2013 | Fleury, Jr. et al. | |
| 2013/0101127 A1* | 4/2013 | Buchmann | H04R 29/005 381/58 |

(Continued)

FOREIGN PATENT DOCUMENTS

| | | |
|---|---|---|
| FR | 2910619 A1 | 6/2008 |
| WO | 2017106490 A1 | 6/2017 |

OTHER PUBLICATIONS

PCT International Search Report and Written Opinion dated Feb. 19, 2019, for PCT International Application No. PCT/US2018/059959, 14 pages.

(Continued)

*Primary Examiner* — Paul M. West

(57) ABSTRACT

Methods and apparatus to detect leaks are disclosed. A disclosed leak probability analysis apparatus associated with a utility distribution system having sensors includes a receiver to receive spectral recording data associated with spectral recordings measured at the sensors, and a storage device to store the spectral recording data. The leak probability analysis apparatus also includes a processor to calculate spectral energies associated with the spectral recording data, calculate deviations of the spectral energies, normalize the spectral energies based on the respective deviations, and generate a leak probability distribution of the utility distribution system based on the normalized spectral energies.

16 Claims, 10 Drawing Sheets

(56) References Cited

U.S. PATENT DOCUMENTS

2015/0052979 A1    2/2015    Cho et al.
2015/0330863 A1    11/2015    Dotan et al.

OTHER PUBLICATIONS

Bachner, "Piping for New Construction-Plastic vs. Copper," Oct. 30, 2015, retrieved online [http://healthybuildingscience.com/2015/10/30/new-construction-piping-plastic-vs-copped/] on Jun. 22, 2018, 17 pages.

Connell et al., "PEX and PP Water Pipes: Assimilable Carbon, Chemicals, and Odors," abstract, American Water Works Association Journal, issued Apr. 2016, vol. 108, No. 4, 1 page.

Lechevallier, "Conditions favouring coliform and HPC bacterial growth in drinking-water and on water contact surfaces," 2003 World Health Organization (WHO), Heterotrophic Plate Counts and Drinking-water Safety, IWA Publishing, London, UK, copyright 2003, pp. 178-197, 21 pages.

Non-Final Office Action dated Sep. 28, 2018, for U.S. Appl. No. 15/589,497, 14 pages.

Notice of Allowance dated Mar. 1, 2019, for U.S. Appl. No. 15/589,497, 9 pages.

PCT International Search Report and Written Opinion dated Jun. 1, 2018, for PCT International Application No. PCT/US2018/020439, 14 pages.

Lee, "An Evaluation of Microbial and Chemical Contamination Sources Related to the Deterioration of Tap Water Quality in the Household Water Supply System," International Journal of Environmental Research and Public Health, Sep. 2013, 10(9): 4143-4160, retrieved at [https://www.ncbi.nlm.nih.gov/pmc/articles/PMC3799508], published online Sep. 6, 2013, 19 pages.

Non-Final Office Action dated Oct. 1, 2019, for U.S. Appl. No. 15/819,677, 13 pages.

Non-Final Office Action dated Oct. 8, 2019, for U.S. Appl. No. 16/424,725, 11 pages.

\* cited by examiner

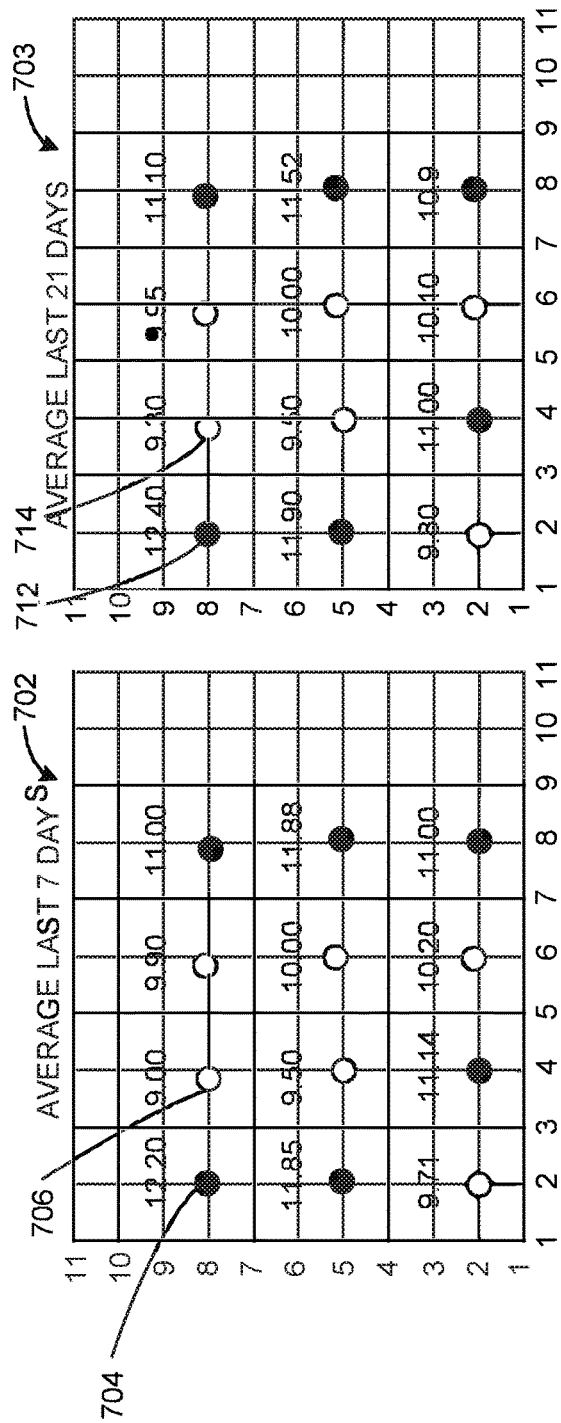
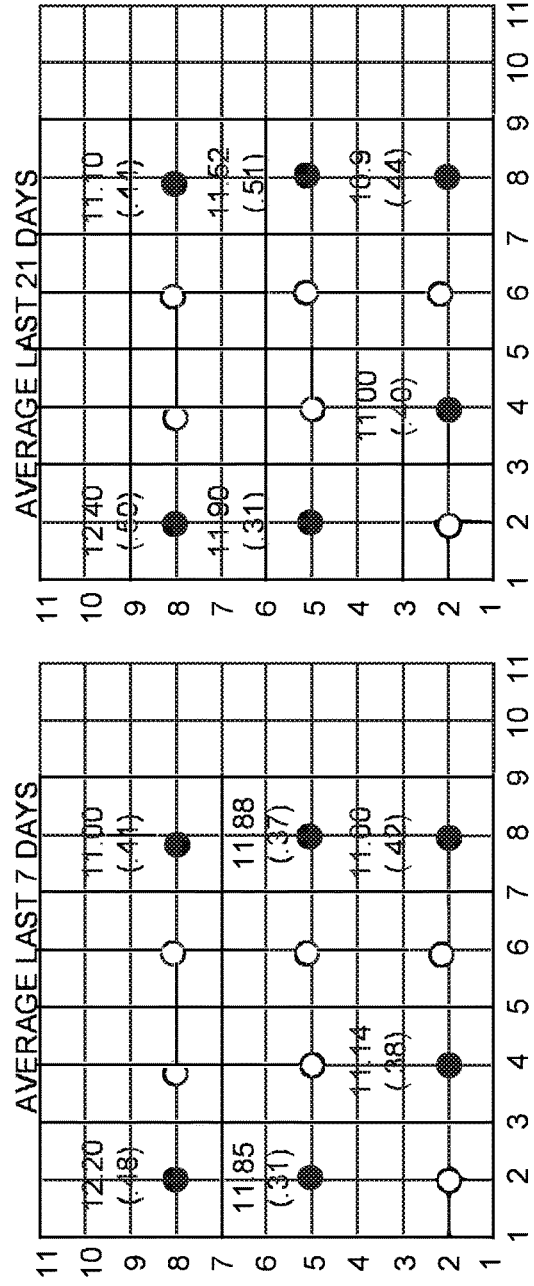
FIG. 7A
FIG. 7B

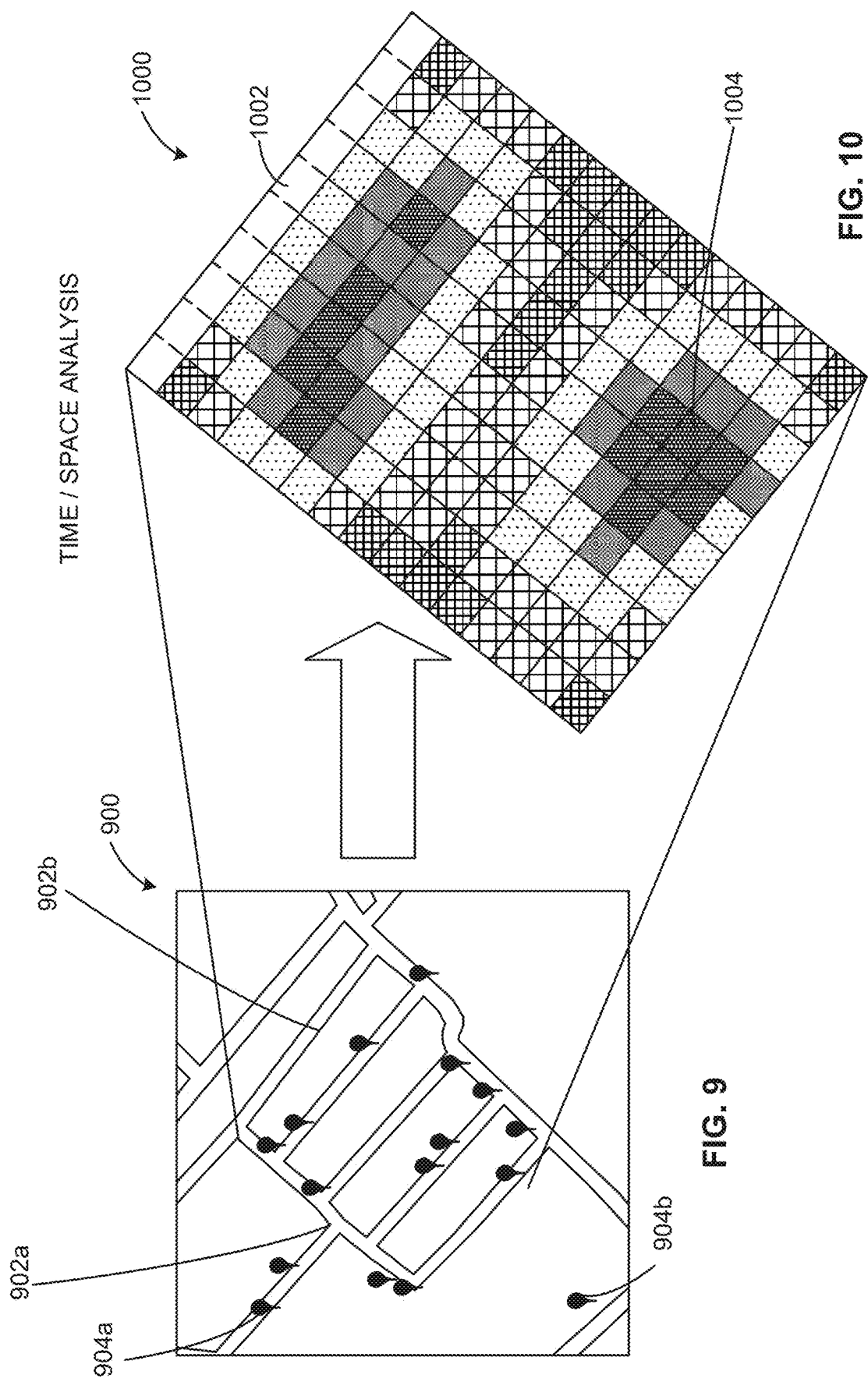

METHODS AND APPARATUS TO DETECT LEAKS

FIELD OF THE DISCLOSURE

This disclosure relates generally to utility delivery systems and, more particularly, to methods and apparatus to detect leaks.

BACKGROUND

Some known leak detection systems used in utility distribution systems (e.g. fluid utility distribution systems) employ leak detection sensors with acoustic sensors that detect noise and/or characteristic sounds, which may be indicative of a potential leak. In particular, these known leak detection sensors are usually coupled to a pipe and/or portion of a fluid delivery system, and utilize parameters, such as amplitude and/or a time-history of acoustic signals to determine a presence of a potential leak. However, use of these parameters can be inaccurate due to environmental noise, etc.

Some known leak detection systems gather and/or collect information from multiple leak detection sensors. However, significant noise and/or environmental interference can prevent accurate determinations of whether a leak has occurred or is occurring. Further, even if an occurrence of a leak can be determined, these known leak detection systems are not generally able to determine and/or pinpoint a precise location of the leak.

BRIEF DESCRIPTION OF THE DRAWINGS

FIGS. 7A, 7B and 8 depict an example 2-D grid in which a spatial analysis according to the example method of FIG. 5 can be performed.

FIG. 9 is an example map with sensor locations shown in relationship to streets.

FIG. 10 shows an example 2-D leak probability distribution and/or heat map derived from normalized spectral energies and related to the example map of FIG. 9.

The figures are not to scale. Wherever possible, the same reference numbers will be used throughout the drawing(s) and accompanying written description to refer to the same or like parts.

DETAILED DESCRIPTION

Figure 1:
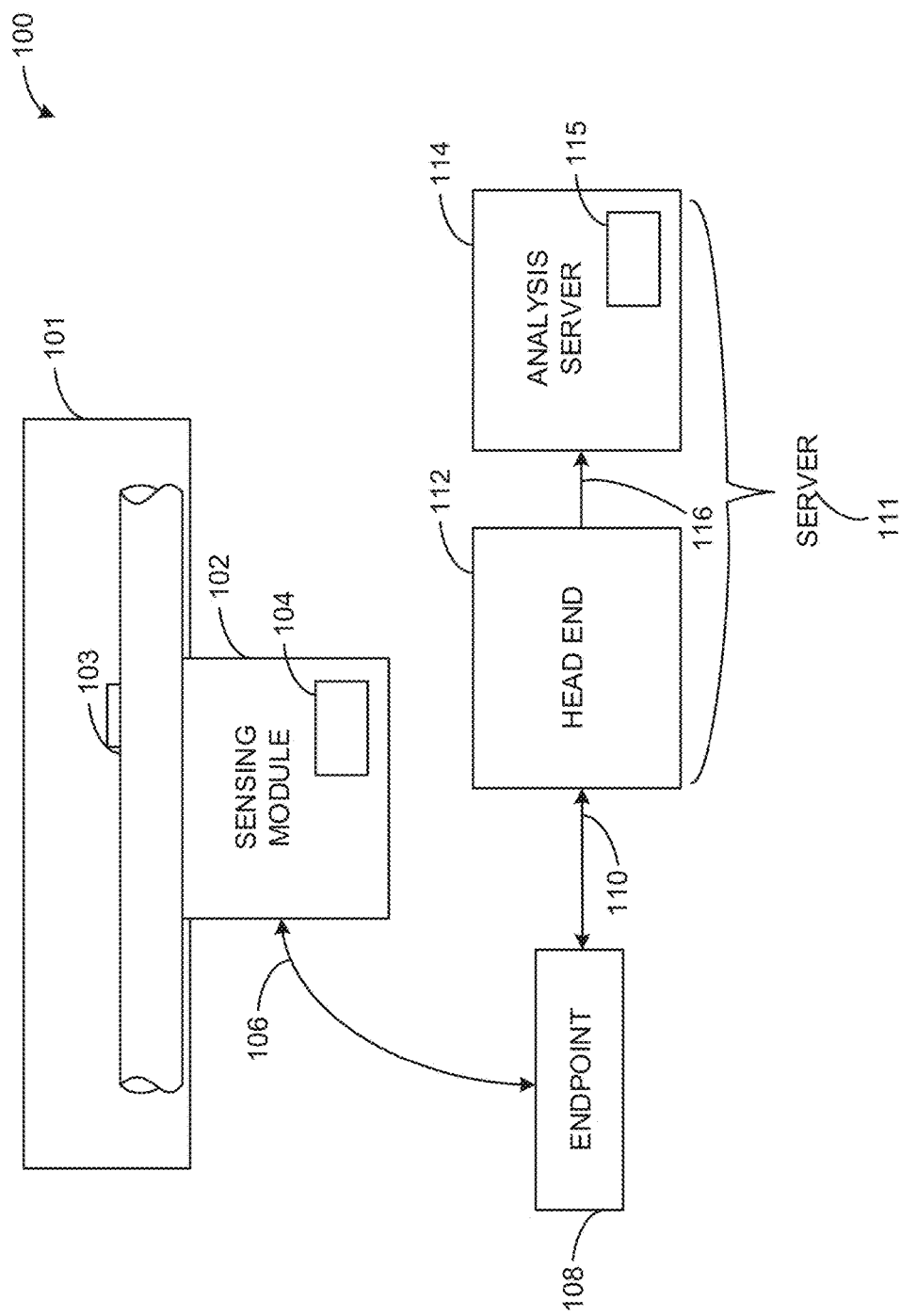
FIG. 1 is a schematic overview of an example utility measuring system in which the examples disclosed herein may be implemented.

Methods and apparatus to detect leaks are disclosed. Some leak detection systems employ leak detectors with acoustic sensors that detect noise and/or characteristic sounds, which may be indicative of a potential leak. However, with these known systems, determination of leaks and/or leak patterns can be difficult due to noise in the system, external noise, slow drift of leak patterns and/or irregular use (e.g., irregular or highly variable utility system usage).

The examples disclosed herein enable very accurate determination of system leak conditions and/or leak probabilities by removing uncertainty that is typically present in leak detection systems. In particular, the examples disclosed herein provide an effective and accurate manner of determining leak conditions and/or a presence of a leak in fluid utility measuring systems by collecting numerous system-wide spectral recording measurements from multiple sensors to account for characteristic properties of such systems. These characteristic properties may pertain to environment, implementation and/or typical use (e.g., taking into account seasonal and/or daily variations, etc.).

The examples disclosed herein employ a leak analysis system and/or network that collects sensor data (e.g., acoustic sensor data), which may be transmitted as spectral recordings (e.g., acoustic spectral recordings or data associated with the spectral recordings) from numerous pipe/joint acoustic sensors in a utility distribution system. As a result, random, environmental, usage and/or event-related noise to determine leak probabilities may be accounted for in the overall leak detection system.

The examples disclosed herein utilize acoustic spectral recordings along with two-dimensional (2-D) analysis of time-history data to generate a probabilistic distribution of leaks. To generate these probabilistic distributions, in some examples, spectral averages are computed. Accordingly, spectral energies and associated deviations and/or standard deviations of the spectral recordings/averages are also calculated. In turn, the calculated spectral energies are normalized and/or scaled based on the deviations, thereby enabling generation of a leak probability distribution (e.g., a heat map) that can indicate higher leak probability location(s) of an entire utility distribution system by being compared to known geographic data.

In some examples, a position of a leak and/or a high probability leak area is calculated by the aforementioned leak probability distribution. In such examples, the position may be determined by the leak probability distribution in conjunction with a two-dimensional layout information (e.g., pipe location and/or routing data, mapping data of relative sensor positions, etc.). In some examples, a calculated probability distribution is filtered by a Gaussian filter, or any other appropriate filtering method or kernel.

As used herein, the term "recording" or "spectral recording" refers to a measured or recorded signal, frequency domain signal or time-history that corresponds to a time period (e.g., a pre-defined recording time span). Accordingly, the terms "recording" or "spectral recording" may be stored temporarily (e.g., in random access memory) or in a tangible medium, and may be represented or characterized over a frequency domain, for example. As used herein, the term "spectral average" refers to an averaged signal waveform of multiple spectral recordings.

FIG. 1 is a schematic overview of an example utility measuring system (e.g., a leak probability analysis apparatus) 100 in which the examples disclosed herein may be implemented. According to the illustrated example of FIG. 1, the utility measuring system 100 is to characterize and/or monitor a condition of a utility distribution system (e.g., a utility fluid delivery system, a utility delivery subsystem, a utility delivery system, etc.) 101. The example utility measuring system 100 includes a remote sensor (e.g., a sensing module, a remote spectral analyzer, etc.) 102 that is coupled to a pipe 103 (of the utility distribution system 101) and includes an analysis module 104, and a first bi-directional communication link 106 that communicatively couples the remote sensor 102 to an endpoint (e.g., a utility measuring endpoint, a communication endpoint, a utility endpoint, etc.) 108.

The example utility measuring system 100 also includes a second bi-directional communication link 110 that communicatively couples the endpoint 108 to a server (e.g., a central server, a data collection facility, etc.) 111. The example server 111 includes a head end (e.g., a server gateway, etc.) 112 and an analysis server (e.g., a remote backend server, a computation system, a computation cloud server, etc.) 114, both of which are coupled together via a connection 116, such as a file transfer protocol (FTP) in this example. The example analysis server 114 of the illustrated example includes a system analysis module 115.

In this example, the first bi-directional communication link 106 is implemented as a wired cable and the second bi-directional communication link 110 is implemented as a radio frequency (RF) link. However, any appropriate communication link and/or server/network topographies may be utilized to implement (e.g., a wired or wireless implementation thereof) the communication connections/links 106, 110, 116 instead.

To characterize a condition (e.g., a baseline or current/operating condition) of the utility distribution system 101, the remote sensor 102 of the illustrated example utilizes a sensor to record or measure (e.g., acoustically measure) multiple recordings (e.g., time-domain recordings, frequency domain recordings) from a section or portion of the utility distribution system 101 to define a spectral average, for example. According to the illustrated example, the spectral average is generated based on converted and/or sorted spectral representations of the spectral recordings.

In some examples, the remote sensor 102 is coupled to the pipe 103 of the utility distribution system 101. According to the illustrated example, and as will be discussed in greater detail below in connection with FIGS. 3-12, the analysis module 104 performs averaging of known or baseline recordings to define spectral recording averages or other spectral recording information to determine an overall leak condition of the utility distribution system 101, for example.

In some examples, the analysis module 104 packages or encodes the current recordings, spectral representations, data associated with the spectral recordings (e.g., occurrence, noise level, symbols, etc.) and/or spectral average(s) (e.g., for later transmission to the analysis server 114) into a data packet. In this example, the analysis module 104 packages or encodes the current recordings, spectral recording information and/or an associated spectral average. Additionally or alternatively, the analysis module 104 controls parameters of the remote sensor 102 based on current spectral recording measurements (e.g., a measured amplitude of a current recording) or spectral averages. For example, the analysis module 104 may direct an increase or decrease of a polling frequency and/or control a power mode of the remote sensor 102 based on the measurements (e.g., an increased polling frequency based on a sudden increase in amplitude of the measurements).

To transmit the recordings, the spectral representations/symbols, the spectral averages, the spectral recording data, analysis related to the spectral recordings (e.g., analysis performed by the analysis module 104) and/or determined condition(s) or leak probabilities to the example server 111 (e.g., to the analysis server 114 for later analysis), the remote sensor 102 transmits the aforementioned data packet to the endpoint 108 via the bi-directional communication link 106 and, in turn, the endpoint 108 transmits this data packet to the server 111 via the bi-directional communication link 110. In some examples, the head end 112 then forwards the data packet to the analysis server 114. In particular, the data packet may be utilized and/or analyzed at the analysis server 114, which may be located at a utility control center/facility, to convey a condition of an overall utility node/network and/or direct maintenance crews for repair work need, for example.

In this example, the analysis module 115 is implemented on the server 111 to analyze the spectral recordings, and/or the spectral averages to determine a leak probability distribution of the utility distribution system 101. In some examples, operational functionality of and/or analysis that is at least partially performed by the analysis module 104 or the analysis module 115 is distributed across the remote sensor 102, the endpoint 108 and/or the server 111 (e.g., a distributed analysis/computation topography). Additionally or alternatively, in some examples, the endpoint 108 is integral with the remote sensor 102. In some examples, the remote sensor 102 includes circuitry to receive power from the endpoint 108 and/or other external device.

Figure 2:
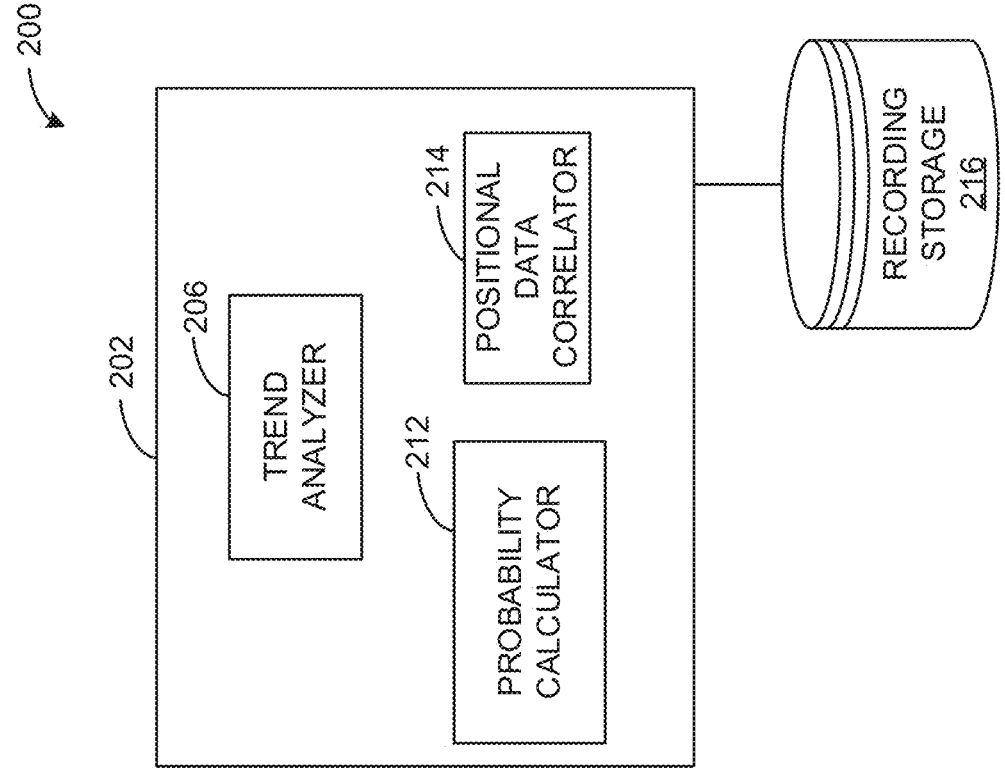
FIG. 2 illustrates an example leak probability analysis module that may be used to determine a leak condition based on data from multiple sensors.

FIG. 2 illustrates an example leak probability analysis module 200 that may be used to determine a leak condition or probabilistic distribution based on spectral recording data associated with multiple ones of the remote sensors 102. The example leak probability analysis module 200 may be implemented in the analysis server 114, the system analysis module 115, the remote sensor 102 and/or the analysis module 104. The leak probability analysis module 200 of the illustrated example includes a leak computation module 202, which includes a spectral recording analyzer 204, a trend analyzer 206, a probability calculator 212 and a positional data correlator 214. In this example, the leak probability analysis module 200 also includes a recording storage 216.

To direct collection of, characterize, analyze, maintain quality of spectral recordings used for analysis and/or sort spectral recordings measured at the remote sensors 102, the spectral recording analyzer 204 is used to determine a noise level and/or spectral energy of the spectral recordings and/or their associated spectral averages. Additionally or alternatively, the spectral recording analyzer 204 identifies peak movement(s) or shifts of the spectral recordings and/or compares the spectral recordings with known leak signatures. In some examples, the spectral recording analyzer 204 sorts out the spectral recordings to maintain an average quality (e.g., lack of noise so that the spectral recordings can be analyzed).

To determine that at least one of the remote sensors 102 is trending away from a baseline non-leak detection condition, the example trend analyzer 206 analyzes shifts or trends in the remote sensors 102 and/or a change in shape or peak centering of respective spectral recordings or spectral recording averages.

According to the illustrated example, the probability calculator 212 calculates spectral energies related to the spectral recordings and/or the spectral recording averages and normalizes these calculated spectral energies to generate a leak probability distribution (e.g., an array, a heat map, etc.). In some examples, the probability calculator 212 removes individual points from consideration in an analysis of the leak probability distribution (e.g., 2-D points in x, y coordinates) having a calculated spectral energy below a defined threshold.

The positional data correlator 214 of the illustrated example is used to calculate a position or area of a probable leak position. In particular, the positional data correlator 214 utilizes the generated leak probability distribution generated by the probability calculator 212 in conjunction with known geographic information, such as sensor locations and/or two-dimensional pipe routing information, to determine (e.g., pinpoint or triangulate) specific utility system pipe or node locations having a high probability of a leak.

According to the illustrated example, the recording storage 216 stores spectral recordings, spectral averages, averaged spectral recordings/waveforms and/or leak probability indicators (e.g., indications of a potential leak) received from the remote sensors 102 via the endpoint 108 or the analysis module 115.

Figure 3:
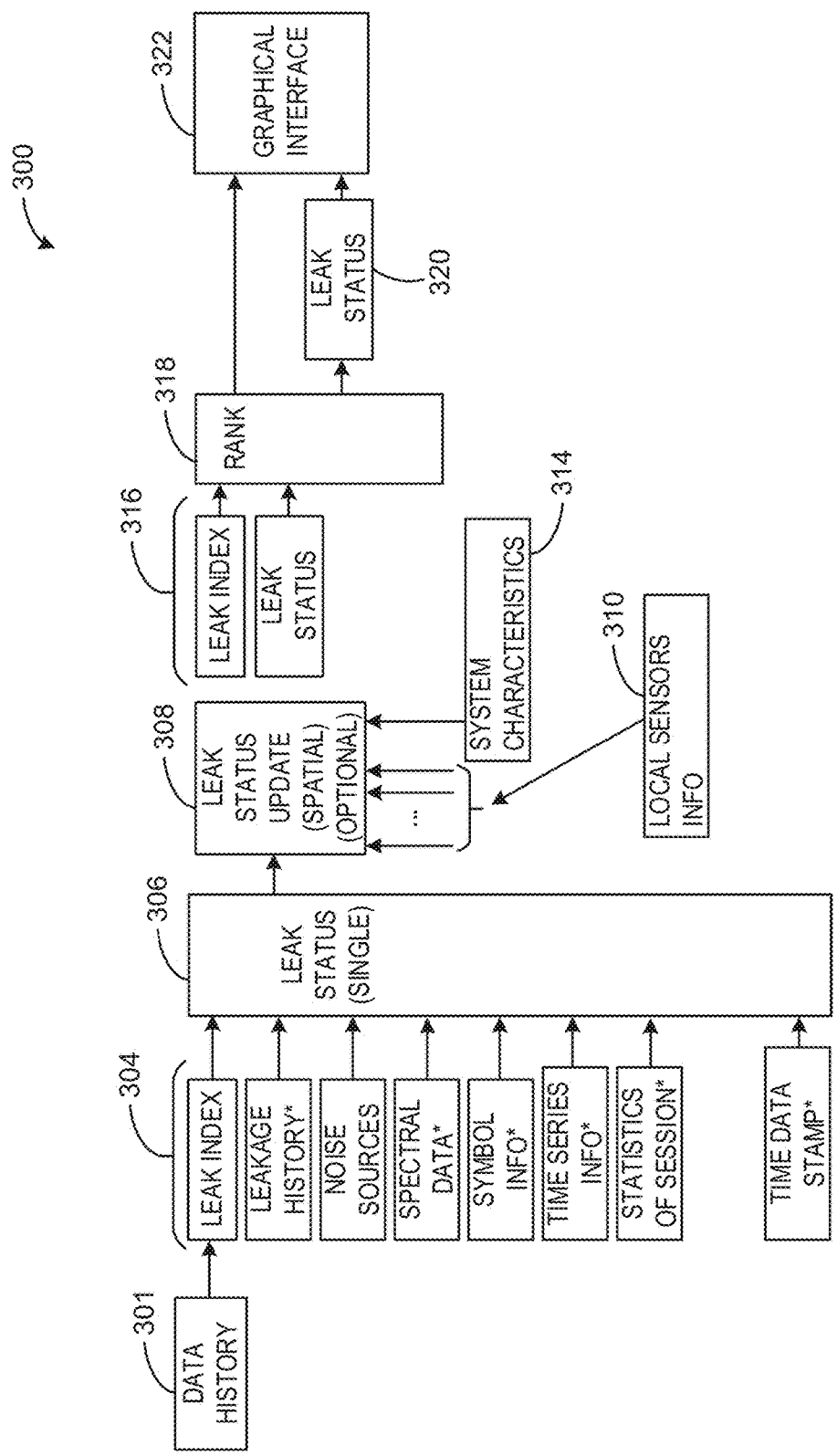
FIG. 3 is an overview of an example analysis methodology in accordance with the teachings of this disclosure.

FIG. 3 is an overview of an example spatial analysis methodology 300 in accordance with the teachings of this disclosure. The example analysis methodology 300 may be implemented by the analysis module 104 of the remote sensor 102 and/or the system analysis module 115 of the analysis server 114 shown in FIG. 1. The example spatial analysis methodology 300 is used to illustrate how an overview analysis may be performed in accordance with the teachings of this disclosure.

According to the illustrated example of FIG. 3, to characterize a leak condition of the utility distribution system 101, a data history 301 and/or the analysis module 104 is analyzed by the remote sensor 102 to determine or calculate corresponding parameters 304. In particular, spectral recordings and/or spectral averages associated with the data history 301 are used to determine the parameters 304. In some examples, the parameters 304 include, but are not limited to, a leak index, leakage history, noise sources, spectral data, symbol information, time series information, statistics of a data recording session, temperature information and/or time data stamp data. Accordingly, a leak status 306 corresponding to the remote sensor 102 is determined. In particular, it is determined whether there is no leak, whether a leak is possible, or whether a leak is substantially probable. Additionally or alternatively, the leak status 306 consists of a numeric value or ratio indicating a probability of a leak.

To determine an updated leak status 308 of the utility distribution system 101, spectral recordings and/or associated spectral recording averages are also gathered from others of the remote sensors 102 and analyzed using spatial analysis techniques, including analyzing shifts or trends over at least one defined time period (e.g., several days, several months, several years, etc.). In particular, the spectral recordings of each of the remote sensors 102 are averaged together to determine shifts away from respective baseline spectral recordings and/or spectral averages. According to the illustrated example, local sensors information 310 and system characteristics 314 are provided to the leak status update 308 to perform the aforementioned spatial analysis.

According to the illustrated example, the leak status update 308 provides an output 316. The output 316 may include, but is not limited to, the leak index, which may be a probability value (e.g., 0-100, 0-1, etc.) that indicates a probability of a leak of the corresponding remote sensor 102, and a leak status. In particular, the leak status may indicate a potential leak and/or leak probability that has been trending upwards (e.g., trending upwards for months).

The output 316 of the illustrated example is used to identify and/or calculate a rank 318 of each of the remote sensors 102 according to leak probability/likelihood. In particular, the example rank 318 pertains to a relative probabilistic rank pertaining to a probability of each individual sensor 102 having a leak. In other words, the rank 318 corresponds to a relative indication of a leak probability of each of the remote sensors 102 in comparison to other of the remote sensors 102 present in the utility distribution system 101.

In some examples, an output 320 from the rank 318 is provided to a graphical interface 322. As a result, the graphical interface 322 generates a 2-D array that may be used to generate a heat map or gradient map that indicates relative leak probabilities.

Figure 4:
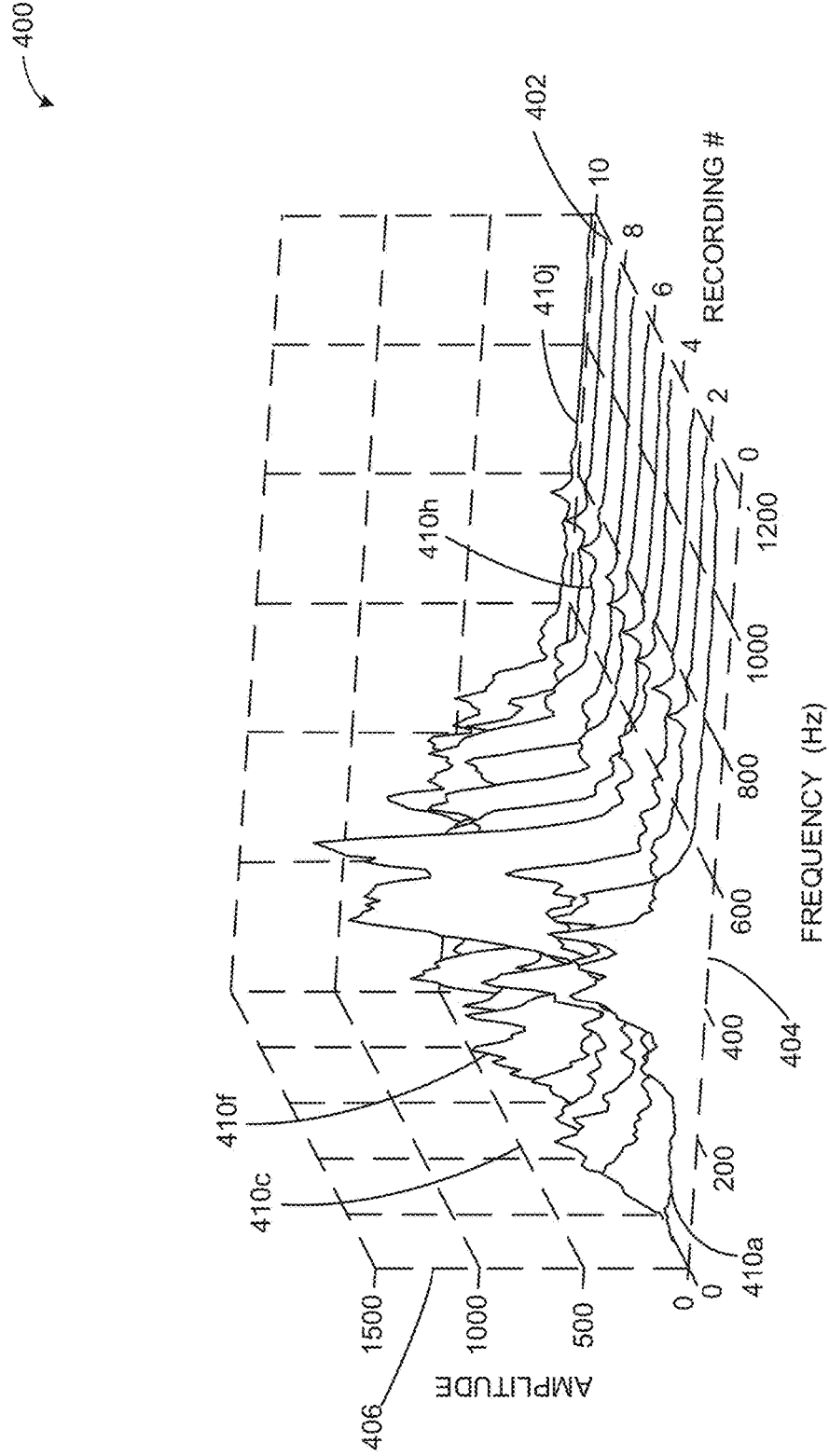
FIG. 4 is a plot depicting example spectral recordings during a single recording session.

FIG. 4 is a graph 400 depicting example spectral recordings/averages associated with the remote sensor 102 during a single recording session. The graph 400 includes a first axis 402 pertaining to spectral recording numbers (e.g., interval spectral recording numbers, time interval spectral recordings numbers), a second axis 404 pertaining to frequency in hertz (Hz) and a third axis 406 pertaining to an amplitude of the spectral recordings/averages. Accordingly, spectral recording waveforms or spectral recordings 410 (hereinafter 410a-410j) are also shown in the graph 400.

In operation, high resolution data analysis of the remote sensor 102 may be performed on the spectral recordings 410 during or after a recording session. In particular, each of the spectral recordings 410 measured at the remote sensor 102 are captured/detected and classified as noise signatures, which may be later transmitted as symbols, for example. In some examples, a lookup database may be used to make a determination of a degree to which the spectral recordings 410 correlate to a known noise signature (e.g., a known mains hum or a leak signature, etc.). As a result, a symbol (a value from 1:n) that indexes the noise signature can be sent in conjunction with a confidence level that indicates how well the individual spectral recording 410 correlates and/or exhibits similarity to a database signature (e.g., a correlation analysis).

In some examples, quality of the spectral recordings 410 are analyzed (e.g., low quality spectral recordings 410 are disregarded or discarded, etc.) by the analysis module 104. For example, the overall spectral envelope may be taken and compared to the individual spectral recordings 410 (e.g., a correlation, a coherence, a standard deviation, etc.). Additionally or alternatively, a degree to which each of the spectral recordings 410 during the session compares to the respective previous recording 410 is analyzed (e.g., analyzed on a quantified basis, a correlation analysis, a degree of change analysis, etc.). In some examples, the spectral recordings 410 are binned to a bin frequency. Additionally or alternatively, only certain frequency ranges of the spectral recordings 410 are analyzed (i.e., spectral frequency ranges are truncated) based on relevance.

In some examples, data pertaining to the spectral recordings 410 is compressed (e.g., for later transmission). For example, if transmission of such data is bandwidth limited, frequency range and signal amplitude may be compressed instead of sending the complete spectral recording 410 from the remote sensor 102 to the server 111.

While an example manner of implementing the leak probability analysis module 200 of FIG. 2 is illustrated in FIG. 2, one or more of the elements, processes and/or devices illustrated in FIG. 2 may be combined, divided, re-arranged, omitted, eliminated and/or implemented in any other way. Further, the example leak computation module 202, the example spectral recording analyzer 204, the example trend analyzer 206, the example probability calculator 212, the example positional data correlator 214 and/or, more generally, the example leak probability analysis module 200 of FIG. 2 may be implemented by hardware, software, firmware and/or any combination of hardware, software and/or firmware. Thus, for example, any of the example leak computation module 202, the example spectral recording analyzer 204, the example trend analyzer 206, the example probability calculator 212, the example positional data correlator 214 and/or, more generally, the example leak probability analysis module 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example leak computation module 202, the example spectral recording analyzer 204, the example trend analyzer 206, the example probability calculator 212, and/or the example positional data correlator 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example leak probability analysis module 200 of FIG. 2 may include one or more elements, processes and/or devices in addition to, or instead of, those illustrated in FIG. 2, and/or may include more than one of any or all of the illustrated elements, processes and devices.

Figure 5:
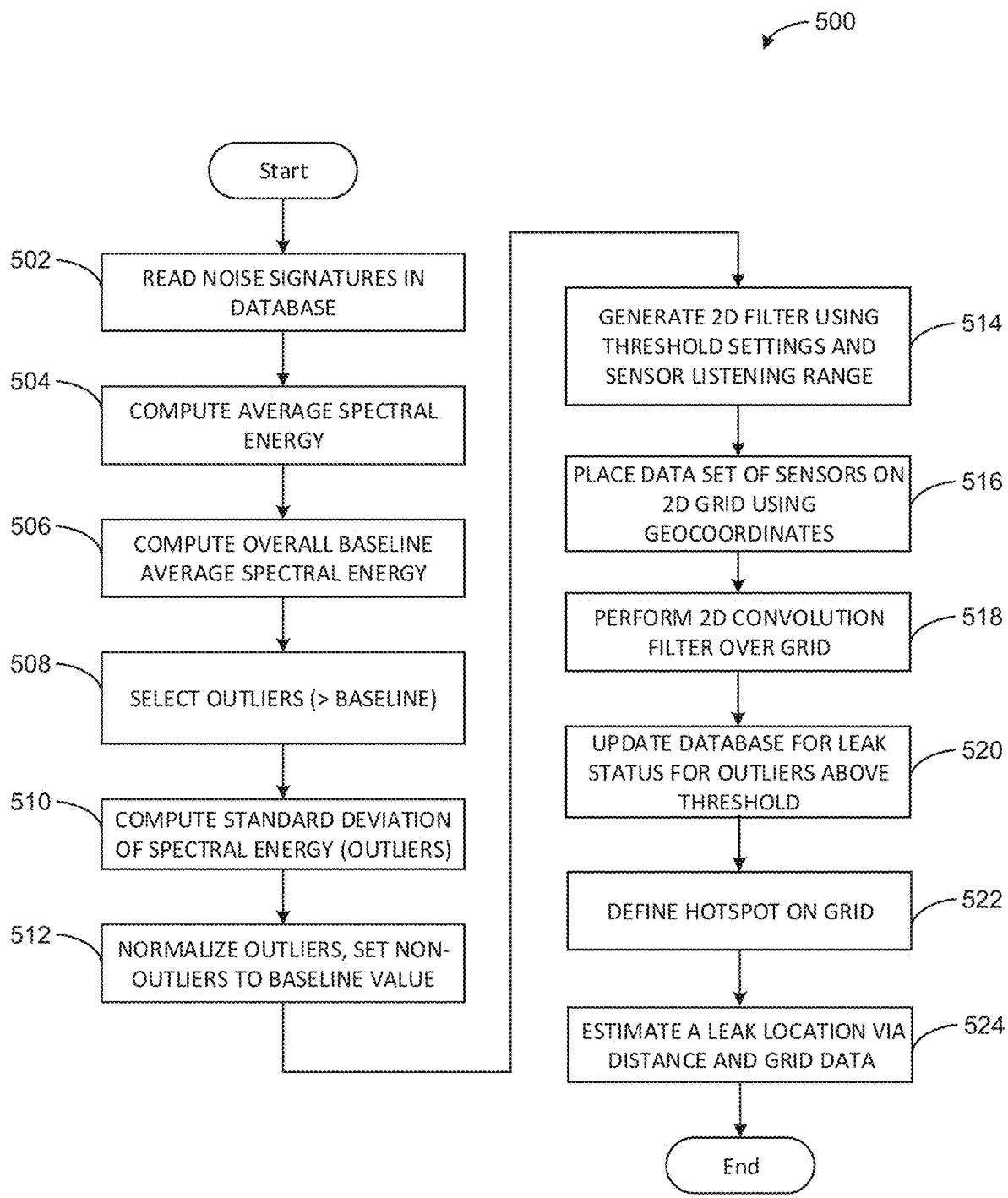
FIG. 5 is a flowchart representative of an example method in accordance with the teachings of this disclosure.

A flowchart representative of example machine readable instructions for implementing the leak probability analysis module 200 of FIG. 2 is shown in FIG. 5. In this example, the machine readable instructions comprise a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 5 many other methods of implementing the example leak probability analysis module 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 500 of FIG. 5 begins as numerous spectral recordings, spectral recording indicators/representations, selected spectral recordings and/or spectral recording averages from the remote sensors 102 have been received and the probability calculator 212 is being used to calculate a two-dimensional probabilistic determination of potential leaks within the utility distribution system 101. In this example, a spectral recording and/or average received from each of the remote sensors 102 is used to calculate the two-dimensional probabilistic determination of potential leaks for the overall utility distribution system 101.

In this example, the spectral recordings and/or their associated data are periodically received by the server 111. In other examples, a determined increase in leak probability by the remote sensor 102 is used to cause or trigger one or more of the remote sensors 102 to transmit spectral recordings and/or associated data pertaining to the spectral recordings (e.g., compressed spectral recordings and/or averages, peak movement/shift data, etc.).

According to the illustrated example, the endpoint 108 receives multiple spectral recordings or noise signatures to be stored in an array and/or a database of the recording storage 216 (block 502). In some examples, the analysis module 104 converts the spectral recordings into representative data of the spectral recordings (e.g., spectral recording averages, spectral identifiers, etc.) prior to transmission to the endpoint 108. In other words, the endpoint 108 may receive spectral recording representations, identifiers and/or spectral recording averages instead of the spectral recordings.

In this example, the spectral recording analyzer 204 computes spectral energy averages for each of the spectral recordings and/or associated spectral recording averages (block 504). In some examples, the spectral recording averages are averaged by Equation 1 below:

$$\bar{x} = \frac{\sum x}{n} \qquad (1)$$

In other examples, the average spectral energies are computed by each of the remote sensors 102 and/or their corresponding analysis modules 104 instead of the analysis server 114.

In some examples, the spectral recording analyzer 204 and/or the probability calculator 212 computes an overall baseline average (e.g., an overall system average spectral energy) of spectral energies corresponding to all of the respective remote sensors 102 (block 506).

In this example, outliers are selected (e.g., outliers that exceed values of baseline averages) by the probability calculator 212 (block 508). In other words, the outliers are selected by comparing each of the spectral energies to the overall baseline spectral energy and nodes having values higher than the baseline spectral energy are designated as outliers for future analysis.

According to the illustrated example, deviations, such as standard deviations, for example, of the selected outliers are calculated by the spectral recording analyzer 204 and/or the probability calculator 212 (block 510). Accordingly, in this example, standard deviations are calculated as shown in Equation 2 below.

$$S = \sqrt{\frac{1}{n-1}\sum_{i=1}^{n}(x_i - \bar{x})^2} \quad (2)$$

In this example, the outliers are normalized and non-outliers are set to a baseline value by the probability calculator 212 (block 512). In other examples, the non-outliers are simply disregarded. An example equation to calculate a normalization is shown in Equation 3 below.

$$y = \frac{\bar{x}}{s} \quad (3)$$

In this example, a 2-D filter is generated by the probability calculator 212 and/or the positional data correlator 214 using threshold settings and a sensor listening range (block 514).

Accordingly, data related to sensors are overlaid onto a 2-D grid by the probability calculator 212 and/or the positional data correlator 214 using known geo-coordinates (block 516).

In some examples, a 2-D convolution filter is performed or run over the aforementioned 2-D grid by the trend analyzer 206, the probability calculator 212 and/or the spectral recording analyzer 204 (block 518). An example equation 4 below illustrates implementation of the convolution filter:

$$I'(u,v) = \sum_{i=-\infty}^{\infty}\sum_{j=-\infty}^{\infty}I(u-i,v-i)H(i,j) = I \otimes H \quad (4)$$

In this example, I(u, v) is the original matrix, I'(u, v) is the transformed image, H(i, j) is the kernel to be applied to the image, and (u, v) are the coordinates of the pixel or row/vector of the matrix. Equation 5 below illustrates an example Gaussian filter kernel that may be implemented in the examples disclosed herein.

$$H(i,j) = \frac{1}{2\pi\sigma^2}e^{\left(-\frac{i^2+j^2}{2\sigma^2}\right)} \quad (5)$$

In some examples, i, j is a matrix of the form equal to 7, 7 and a sigma value ($\sigma$) of 2 is assigned. While a Gaussian filter is described in conjunction with this example, any appropriate filter kernel may be applied.

In this example, a database stored in the recording storage 216 is updated of leak status to include the outliers above the baseline average threshold spectral energy (block 520).

Next, the example positional data correlator 214 and/or the example trend analyzer 206 defines or designates one or more hotspots on the 2-D grid and calculates or determines a position of a leak on the 2-D grid based on distance and grid data (block 522).

According to the illustrated example, the positional data correlator 214 determines or estimates a leak location based on distance, positional data, schematic locations of components and/or grid data (block 524) and the process ends. In particular, known geographical data may be used to pinpoint specific leak location(s).

Figure 6:
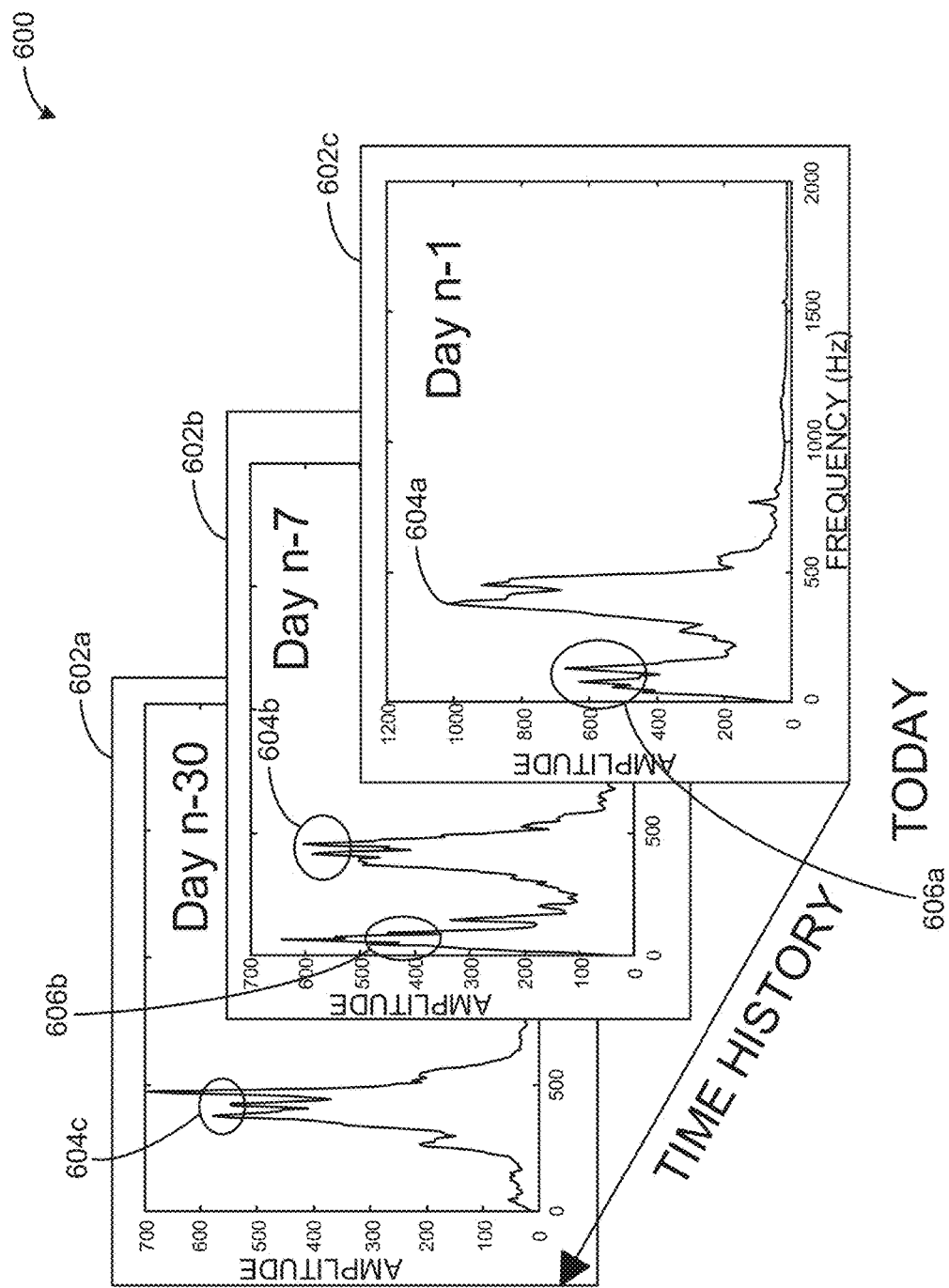
FIG. 6 includes plots illustrating how multiple spectral recordings/averages may be analyzed for trends to determine leak probability distributions.

FIG. 6 includes plots 600 illustrating how multiple spectral recordings/averages of one of the remote sensors 102 may be analyzed for trends to determine leak probability distributions (e.g., 2-D leak probability distributions). In other words, an analysis of the data associated with the single sensor 102 may be used to at least partially define an overall 2-D probabilistic distribution is shown. As can be seen in the illustrated example of FIG. 6, plots 602 (hereinafter 602a, 602b, 602c, etc.) include several spectral recordings and/or spectral averages are taken over a few days. In some examples, shifts in peaks and/or changes in waveform shape of the spectral recordings may be analyzed to determine probabilities and/or probability distributions of the utility distribution system 101.

In this example, a peak 604 (hereinafter 604a, 604b, 604c) remains relatively constant throughout the different plots 602. In particular, an amplitude of the peak 604 varies, but a corresponding peak frequency does not significantly change between the plots 602. Further, additional noise content 606 (hereinafter 606a, 606b) is seen at relatively low frequencies. However, in this example, information related to the noise content does not affect a location of the peaks 604 over time. The examples disclosed herein are able to perform spatial analysis that effectively characterizes the peaks 604 relative to the noise content 606.

In some examples, data represented by the plots 600 are monitored to trigger a spatial analysis of the utility distribution system 101. In particular, a shift of a spectral recording and/or associate spectral recording average pertaining to at least one of the remote sensors 102 may be monitored to cause execution of the example method 500 of FIG. 5.

Figure 8:
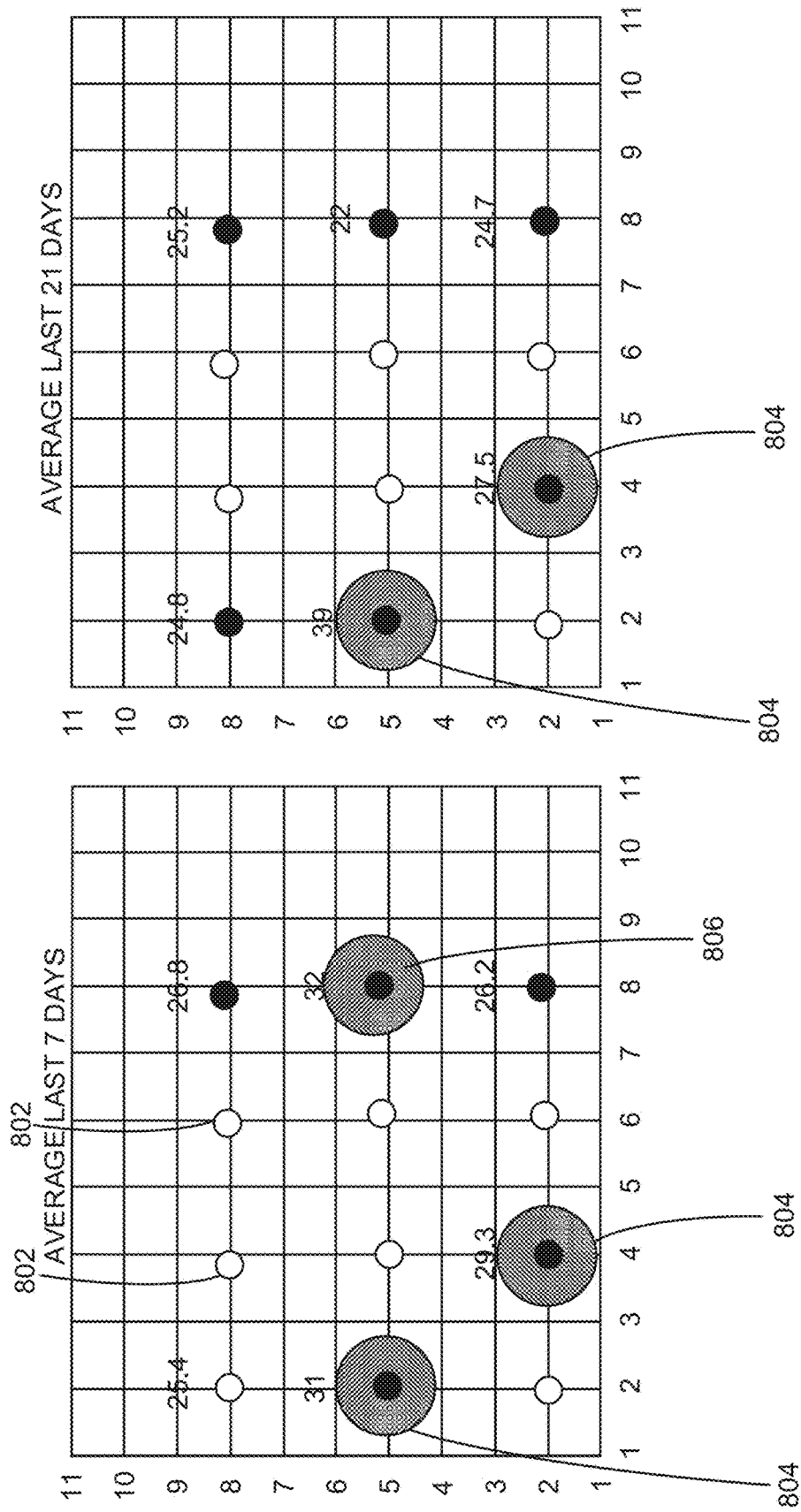

FIGS. 7A, 7B and 8 depict an example 2-D grid in which a spatial analysis according to the example method 500 of FIG. 5 is performed. Turning to FIG. 7A, an example 2-D grid is shown with a first plot 702 corresponding to the past 7 days, as well as a second plot 703 corresponding to the past 21 days. According to the illustrated example, an average spectral energy pertaining to spectral recordings/averages of each of the remote sensors 102 is calculated and displayed on a 2-D grid. For example, this average spectral energy may be a total energy over an entire frequency range or within specific frequency bands (e.g., binned frequency bands). In this particular example, a grid 702 depicting an average of last 7 days and an average of last 21 days of the spectral recordings is shown. Both time periods are examined to average out any fluctuations in data that can cause false leak indications.

In this example, the mean of the spectral energy calculations is calculated to be 10.7. Accordingly, any of the remote sensors 102 with average results exceeding this mean selected and denoted by black circles 704 while an average result below a value of 10.7 is ignored or assigned the value of the average and depicted by white circles 706. Similarly, black circles 712 and white circles 714 are displayed on the second plot 703.

FIG. 7B illustrates the data of FIG. 7A, but with added standard deviation calculations for each of the spectral energies. According to the illustrated example, the standard deviation of the energy for each of the selected remote sensors 102 is calculated for both 7 days and 21 days based on the premise that if a leak exists, there can be a relatively small (e.g., a minimal) change in sound level over a day to day basis. In such scenarios, with little change on a day-to-day basis, there will be some noise in the results, but results show that if the standard deviation is relatively small and remains relatively small or does not change significantly over a short duration (e.g., 7 days) and a long duration (e.g., 21 days), a constant noise source may be indicated.

The standard deviation differing significantly between the 7 day and 21 day periods is likely to indicate a noise source is not constant or is starting to change. Therefore, use of the standard deviation in accordance with the teachings of this disclosure enables relatively subtle changes to be identified.

By examining averages and/or average trends of different overlapping time periods, a data set can clearly illustrate any shifting trends. In some example methods, quartile analysis is performed in which a data range/time period is divided into 4 time sectors, for example. In other words, varying numbers of time periods (e.g., five, fifty, one hundred, etc.) may be used beyond the two shown in this example.

FIG. 8 illustrates normalization of the spectral averages over the two different time periods (7 days and 21 days) illustrated in relationship to the 2-D grids of FIGS. 7A and 7B. According to the illustrated example, the spectral averages are normalized by dividing the average spectral energies of each node by the respective standard deviations to reveal potential stationary noise sources, which may exist just above the noise floor. In this example, nodes 802, which are depicted by white circles, indicate nodes that have not been selected and/or have spectral energies below a normalized spectral energy threshold. In some examples, the nodes 802 are eliminated from consideration by having a lower spectral energy than an average normalized spectral energy of all the nodes. According to the illustrated example, circles 804 indicate leak/stationary signal(s) that appear to be stationary for 21 days while a circle 806 indicates a leak that may be emerging because it has only appeared in the last 7 days based on its normalized spectral energy.

In this example, the average of all normalized results is approximately 27.09 and is thereby considered to be a threshold level for a potential leak. Accordingly, values above this threshold indicate a potential stationary signal or signal that is above the noise floor and increasing. In this example, the sensor 102 at a coordinate location of 2, 5 (x, y coordinates in the current view) is above a value of 31 in both time periods, thereby indicating a stationary signal over the last 21 days. Further, a sensor corresponding to a coordinate location of 8, 5 rises above the threshold in the most recent 7 days, thereby indicating that a potential leak/stationary signal is emerging.

Turning to FIG. 9, an example map 900 is shown with sensor locations 902 (hereinafter 902*a*, 902*b*, etc.) in relationship to streets 904 (hereinafter 904*a*, 904*b* etc.). According to the illustrated example, relative positions of the sensor locations and/or the streets 902 are used to define a 2-D grid and/or coordinate system that can be analyzed in conjunction with a 2-D leak probability distribution. However, any type of geo-location and/or spatial relationship can be used in such an analysis.

FIG. 10 shows a 2-D leak probability distribution and/or heat map 1000 derived from filtering normalized spectral energies and to be used in conjunction with the map 900 of FIG. 9. In particular, the probability distribution 1000 is a 2-D representation or overlay of the map 900. In this example, the normalized spectral energies are filtered via a Gaussian filter to yield the probability distribution 1000. Accordingly, the probability distribution 1000 includes low probability leak locations 1002 as well as high probability leak locations (e.g., darker portions) 1004.

According to the illustrated example, the probability distribution 1000 in conjunction with geolocation data and/or positioning of piping can be used to determine leak locations. For example, the probability distribution can be used to ascertain geographical areas by taking into account known utility system geographic data (e.g., pipe and/or junction positional/routing information, relative meter locations, etc.). Additionally or alternatively, triangulation is used to determine potential leak locations or hot spots.

In some examples, additional 2-D data is also overlaid on the probability distribution 1000, such as, but not limited to, traffic density data, typical noise level distribution, temperature gradients, etc. In particular, overlaying additional information can be used for troubleshooting and/or locational determination of issues occurring on the utility distribution system 101.

While the examples disclosed herein are shown related to a two-dimensional analysis, any appropriate type of a dimensional analysis may be performed. For example, the analysis may be three-dimensional or fourth-dimensional (e.g., a sending node system that can account for node analysis in additional dimensions, such as position and time, in comparison to a 2-D plane).

Figure 11:
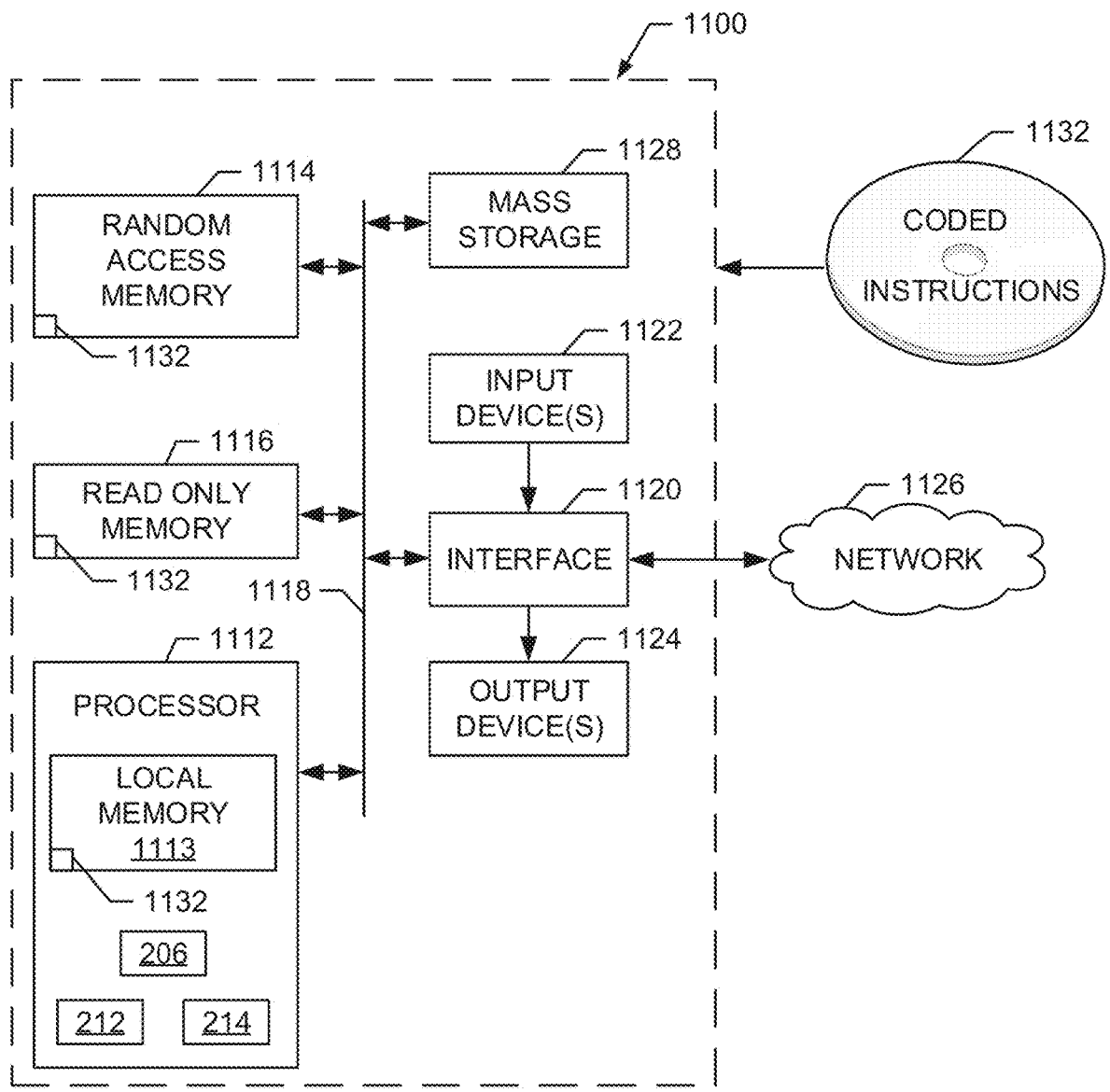
FIG. 11 is a processor platform that may be used to execute the example instructions of FIG. 5 to implement the example leak probability analysis module 200 of FIG. 2.

FIG. 11 is a block diagram of an example processor platform 1100 capable of executing the instructions of FIG. 5 to implement the leak probability analysis module 200 of FIG. 2. The processor platform 1100 can be, for example, a server, a personal computer, a mobile device (e.g., a cell phone, a smart phone, a tablet such as an iPad™), a personal digital assistant (PDA), a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor implements the example trend analyzer 206, the example probability calculator 212 and the example positional data correlator 214.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIG. 5 may be stored in the mass storage device 1128, in the volatile memory 1114, in the non-volatile memory 1116, and/or on a removable tangible computer readable storage medium such as a CD or DVD.

From the foregoing, it will be appreciated that example methods and apparatus have been disclosed that can accurately determine a probability distribution of leaks for the utility distribution system and can also accurately determine leak positions by utilizing positional data (e.g., pipe layout coordinates, etc.). As a result, repair crews can repair an identified leak and/or an identified leak hot spot, for example, without unnecessary searching and/or exploratory efforts (e.g., exploratory digging) to search for the leak, which can have significant labor costs in some scenarios.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to utility distribution systems, the examples disclosed herein may be applied to any appropriate waveform analysis, spatial analysis and/or position-based applications.

What is claimed is:

1. A leak probability analysis apparatus associated with a utility distribution system having sensors, the apparatus comprising:
   a receiver to receive spectral recording data associated with spectral recordings measured at the sensors;
   a storage device to store the spectral recording data; and
   a processor to:
   calculate spectral energies associated with the spectral recording data,
   calculate deviations of the spectral energies,
   normalize the spectral energies based on the respective deviations,
   generate a leak probability distribution of the utility distribution system based on the normalized spectral energies, and
   filter the leak probability distribution via a Gaussian filter.

2. The apparatus as defined in claim 1, wherein the processor is to generate a two-dimensional heat map associated with the leak probability distribution.

3. The apparatus as defined in claim 1, wherein the processor is to calculate a position of a leak based on the leak probability distribution based on known utility system geographic data.

4. A method comprising:
   calculating, by executing an instruction with a processor, spectral energies corresponding to spectral recordings measured at sensors of a utility distribution system;
   calculating, by executing an instruction with the processor, deviations of the spectral energies;
   normalizing, by executing an instruction with the processor, the spectral energies based on the respective deviations;
   generating, by executing an instruction with the processor, a leak probability distribution of the utility distribution system based on the normalized spectral energies; and
   filtering the leak probability distribution via a Gaussian filter.

5. The method as defined in claim 4, further including selecting, by executing an instruction with the processor, a bin frequency of the spectral recordings.

6. The method as defined in claim 4, further including removing, by executing an instruction with the processor, at least one of the spectral energies that have a value below a spectral energy threshold.

7. The method as defined in claim 4, wherein calculating the spectral energies includes calculating a spectral energy of a spectral recording.

8. The method as defined in claim 4, further including determining, by executing an instruction with the processor, a position of a leak based on the leak probability distribution.

9. The method as defined in claim 8, wherein determining the position of the leak includes correlating the leak probability distribution to known utility system geographic data.

10. A tangible machine readable medium comprising instructions, which when executed, cause a processor to at least:
    calculate spectral energies corresponding to spectral recordings measured at sensors of a utility distribution system;
    calculate deviations of the spectral energies;
    normalize the spectral energies based on the respective deviations;
    generate a leak probability distribution of the utility distribution system based on the normalized spectral energies; and
    filter the leak probability distribution via a Gaussian filter.

11. The machine readable medium as defined in claim 10, wherein the instructions cause the processor to remove at least one of the spectral energies having values that are below a spectral energy threshold.

12. The machine readable medium as defined in claim 10, wherein the instructions cause the processor to determine a position of a leak based on the leak probability distribution.

13. The machine readable medium as defined in claim 12, wherein the position is determined based on correlating the leak probability distribution to known utility system geographic data.

14. A leak probability analysis apparatus associated with a utility distribution system having sensors, the apparatus comprising:
- a receiver to receive spectral recording data associated with spectral recordings measured at the sensors;
- a storage device to store the spectral recording data; and
- a processor to:
  - calculate spectral energies associated with the spectral recording data,
  - calculate deviations of the spectral energies,
  - normalize the spectral energies based on the respective deviations,
  - generate a leak probability distribution of the utility distribution system based on the normalized spectral energies, and
  - filter the leak probability distribution via a convolution filter.

15. A method comprising:
- calculating, by executing an instruction with a processor, spectral energies corresponding to spectral recordings measured at sensors of a utility distribution system;
- calculating, by executing an instruction with the processor, deviations of the spectral energies;
- normalizing, by executing an instruction with the processor, the spectral energies based on the respective deviations;
- generating, by executing an instruction with the processor, a leak probability distribution of the utility distribution system based on the normalized spectral energies; and
- filtering the leak probability distribution via a convolution filter.

16. A tangible machine readable medium comprising instructions, which when executed, cause a processor to at least:
- calculate spectral energies corresponding to spectral recordings measured at sensors of a utility distribution system;
- calculate deviations of the spectral energies;
- normalize the spectral energies based on the respective deviations;
- generate a leak probability distribution of the utility distribution system based on the normalized spectral energies; and
- filter the leak probability distribution via a convolution filter.

* * * * *